United States Patent [19]
Denisevich, Jr. et al.

[11] Patent Number: 4,597,896
[45] Date of Patent: Jul. 1, 1986

[54] CARBAZOLE-OXADIAZOLE ELECTROACTIVE POLYMERS

[75] Inventors: Peter Denisevich, Jr., Fairfax; Albert H. Schroeder, Richmond; Victor P. Kurkov, San Rafael; Shigeto Suzuki, San Francisco, all of Calif.

[73] Assignee: Chevron Research Company, San Francisco, Calif.

[21] Appl. No.: 664,892

[22] Filed: Oct. 25, 1984

[51] Int. Cl.$^4$ ............................................... H01B 1/00
[52] U.S. Cl. ..................... 252/500; 252/518; 524/80; 524/401; 528/341
[58] Field of Search ................. 252/500, 518; 524/80, 524/401, 408; 528/341, 486, 487, 490, 491, 492, 493

[56] References Cited

U.S. PATENT DOCUMENTS 4,452,725  6/1984  Wellinghoff et al. ............... 528/487
4,502,980  3/1985  Denisevich, Jr. et al. ......... 252/500

OTHER PUBLICATIONS

Makromolecular Chemie, vol. 179, No. 1, pp. 63–71 (1978).

Primary Examiner—Joseph L. Schofer
Assistant Examiner—N. Sarofim
Attorney, Agent, or Firm—T. G. DeJonghe; C. J. Caroli

[57] ABSTRACT

Tractable doped electroactive polymers, comprising recurring units of a 3,6-N-substituted carbazole-1,3,4-oxadiazole-2,5-diyl ring system, and a sufficient concentration of a charge-compensating ionic dopant associated therewith.

10 Claims, No Drawings

CARBAZOLE-OXADIAZOLE ELECTROACTIVE POLYMERS

BACKGROUND OF THE INVENTION

This invention relates to electroactive organic polymeric materials. More specifically, this invention relates to associating electroactivating agents known in the art as dopants with an organic polymer.

Recently, research has been conducted into organic polymeric materials in order to modify their room temperature electrical conductivity by reacting them with electron donor or acceptor molecules. The electron donor or acceptor molecules, generally known in the art as n- and p-type dopants respectively, can transform the organic polymeric materials so that these modified organic polymeric materials exhibit semiconducting and metallic room temperature electrical conductivity. Polyacetylene is an example of an organic polymeric material whose room temperature electrical conductivity can be modified over several orders of magnitude above its insulator state, by the incorporation of dopant molecules, A. J. Heeger et al, U.S. Pat. No. 4,222,903, said patent incorporated herein by reference. Other examples of organic polymeric materials whose room temperature electrical conductivity can be enhanced by several orders of magnitude over their insulator state by means of incorporation of dopant molecules are poly-p-phenylene, polypyrrole, poly-1,6 heptadiyne, and polyphenylene vinylene. However, all of the above recited examples are of organic polymeric materials which are completely insoluble or infusable and hence are completely intractable.

Other examples of organic polymers whose room temperature electrical conductivity can be modified with the aid of dopants are polyphenylene sulfide and poly-m-phenylene. However, the above recited materials though being tractable in their original virgin state, undergo irreversible chemistry when reacted with dopants which modify their room temperature electrical conductivity. This irreversible chemistry imparts upon these dopant modified organic polymeric materials a state of intractability. Upon removal of the doping agents, these materials do not revert to the chemical structure which they originally exhibited prior to being modified by the dopants. The inorganic material polysulfur nitride is also considered a polymeric conductor. As with the previously recited polymeric materials, polysulfur nitride is also completely intractable.

The synthesis of poly(1,3,4-oxadiazole-2,5-diylvinylene) and poly(1,3,4-oxadiazole-2,5-diyl-ethynylene) is described by I. Schopov et al. in Makromolecular Chemie, vol. 179, No. 1, pp. 63–71 (1978). These undoped oxadiazole polymers are shown by Schopov to exhibit an electrical conductivity characteristic of insulators.

U.S. Pat. No. 4,452,725 to Wellinghoff et al. describes an electrically conducting polymer obtained by doping poly(N-alkyl 3,3'-carbazolyl) with a compatible charge transfer acceptor.

For use in a wide variety of electronic device applications, it is highly desirable to have available organic polymeric electrically conducting materials having a preselected room temperature conductivity which can be varied over a broad range. This range should preferably extend from the insulator state of the unmodified organic polymeric material through the semiconducting regime and extending into the highly conducting metallic state. It is also desirable that these organic polymeric electrically conducting materials should be tractable and hence processable so that useful articles of any desired shape and size can be fabricated. Tractable organic polymers are those which can be readily shaped, formed, molded, pressed, cast, etc., into desired articles from the liquid state, i.e. either from the melt, fluid glassy state, or from solution after the completion of the polymerization reaction of the organic polymeric material.

SUMMARY OF THE INVENTION

We have invented an electroactive polymeric material comprising a dopant modified organic polymer whose room temperature electrical conductivity is controlled in a highly selective and reversible manner. Electroactive polymer is defined as a polymer having a conductivity which has been modified with electron acceptor or donor dopants to be greater than the conductivity of the virgin state of the polymer. The electroactive organic polymeric material is fabricated from a virgin polymer, which in itself is completely tractable and processable and which exhibits excellent mechanical and thermal properties as well as being highly stable to oxidative degradation, by modifying the polymer with a conductivity modifier, i.e. electron donor dopants or electron acceptor dopants. The electroactive organic polymeric material is comprised of recurring units of a 3,6-N-substituted carbazole-1,3,4-oxadiazole-2,5-diyl ring system and a conductivity modifier. More specifically, the electroactive polymer is a charged polymer backbone incorporating a sufficient concentration of charge-compensating ionic dopants, i.e., ions of opposite charge to the charge of the polymer backbone. A sufficient concentration of ionic dopants is defined as that concentration which, when associated with the polymer, effects a significant increase in the polymer conductivity, i.e., on the order of about 10% or greater.

Among other factors, the present invention is based on our discovery that 3,6-N-substituted carbazole-1,3,4-oxadiazole-2,5-diyl polymers can be effectively doped with conductivity modifiers to provide electroactive polymers having an electrical conductivity several orders of magnitude greater than the conductivity of the undoped virgin polymers. In addition, the electroactive polymers of the invention are highly tractable and processable and therefore overcome the disadvantages of prior art materials.

In general, an n-type electroactive organic polymer is obtained by reacting the virgin polymer with reducing or electron donor dopants. Electron donor dopants induce n-type conductivity in the polymer by donating an electron to the polymer and reducing same to a polyanion and the dopant is oxidized to a cation. Similarly, a p-type electroactive organic polymer is obtained by reacting the virgin polymer with oxidizing electron acceptor dopants. Electron acceptor dopants induce p-type conductivity in the polymer by oxidizing the polymer to a polycation and the dopant is reduced to an anion. The desired value of the room temperature electrical conductivity of the dopant modified electroactive organic polymer is preselected by controlling the level of incorporation of the dopants into the virgin polymer. Alternatively, the desired value of the room temperature electrical conductivity of the dopant modified electroactive organic polymer is preselected by controlling the length of the reaction time between the virgin polymer and dopants. Furthermore, the highly selective and reversible modification of the room temperature electrical conductivity of the virgin polymer can proceed by either chemical or electrochemical means. The highly selective and reversible modification of the electrical conductivity of the dopant containing organic polymeric material together with the tractability and processability of the virgin polymer is highly desirable in that the fabrication of useful articles and devices such as primary and secondary batteries, photovoltaic devices, Schottky type devices can be accomplished. Furthermore, the materials described in this invention can be utilized as active components in such devices and articles as electrochromic displays and photolithographic processes.

DETAILED DESCRIPTION OF THE INVENTION

The electroactive organic polymers of the invention are tractable and processable virgin polymers consisting of recurring units of a 3,6-N-substituted carbazole-1,3,4-oxadiazole-2,5-diyl ring system modified by suitable conductivity modifiers. The polymers are composed of repeating diradical units derived from 3,6-N-substituted carbazole-1,3,4-oxadiazole-2,5-diyl ring systems wherein the carbazole nitrogen is substituted with lower alkyl of 1–6 carbon atoms or phenyl. A diradical is defined as a molecule that has two unsatisfied positions available for linking into the polymer chain.

Suitable examples of 3,6-N-substituted carbazole-1,3,4-oxadiazole-2,5-diyl recurring units include 3,6-N-phenyl-carbazole-1,3,4-oxadiazole-2,5-diyl, 3,6-N-methyl-carbazole-1,3,4-oxadiazole-2,5-diyl, 3,6-N-ethyl-carbazole-1,3,4-oxadiazole-2,5-diyl, 3,6-N-propylcarbazole-1,3,4-oxadiazole-2,5-diyl, and the like. Preferably, the N-substituted carbazole is the N-ethyl derivative.

The polymer is rendered electroactive by incorporating into the virgin polymer a conductivity modifier. More specifically, the polymer is rendered electroactive by removing electron from (oxidizing) the virgin polymer backbone. This can be accomplished by incorporating into the virgin polymer a conductivity modifier which is an electron acceptor dopant. An electron acceptor dopant removes an electron from the polymer, the polymer becoming oxidized to a polycation and the dopant becoming reduced to an anion. Alternatively, the polymer can be rendered electroactive by electrochemical oxidation. In this case an electron is removed from the polymer from an electrode, and charge-compensating anions are incorporated into the polymer from the supporting electrolyte solution.

Consequently, the resulting electroactive polymer consists of a charged polymer backbone incorporating charge-compensating ionic dopants. A suitable negatively charged compensating dopant, i.e. anionic dopants, can be an anion such as the halogen ions, other ions such as $AsF_4^-$, and preferably ions such as $AsF_6^-$, $ClO_4^-$, $PF_6^-$, $SO_3CF_3^-$, $BF_4^-$, $NO_3^-$, $POF_4^-$, $CN^-$, $SiF_5^-$, $SbCl_6^-$, $SbF_6^-$, $HSO_4^-$, organic anions such as $CH_3CO_2^-$ (acetate), $C_6H_5CO_2^-$ (benzoate), $CH_3C_6H_4SO_3^-$ (tosylate), strong Lewis bases, and the like. Mixtures of the charge-compensating dopants can be employed. These ionic dopants produce a p-type conductivity when associated with an oxidized or positively charged polymer polycation.

The dopant modified electroactive polymer has a charge opposite to the conductivity modifier, i.e. ionic dopant. The charges on the dopant modified electroactive polymer and the ionic dopant balance so that the dopant modified electroactive polymer is an electrically neutral system. The association of the virgin polymer with electron acceptor dopants produces an electroactive polymer with p-type conductivity. More specifically, oxidation of the polymer and incorporation of anionic charge-compensating dopants produces a polymer with p-type conductivity.

The tractable electroactive polymers of the invention, which comprise a charged polymer backbone and charge-compensating ionic dopants associated therewith, can be represented by the following formula:

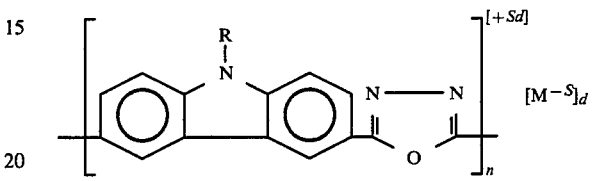

wherein R is lower alkyl of 1 to 6 carbon atoms or phenyl; n is an integer from 2 to 1,000; d is an integer from 1 to 2,000; S is an integer from 1 to 3; and M is a charge-compensating ionic dopant of opposite electrical charge to the charge of the polymer backbone; wherein the polymer backbone is capable of undergoing reversible oxidation to form the charged polymer backbone.

The molecular weight determines the physical properties of the electroactive polymer. The magnitude of n is a function of the molecular weight. Preferably, n is from B 5 to 500. Most preferably, n is from 10 to 300. Molecular weights of the polymer should be between about 500 and 250,000. A preferred molecular weight is above about 10,000. Tractable films are formed with electroactive polymers wherein n is adjusted so that the molecular weight exceeds 10,000.

The enhancement in conductivity of the electroactive polymer above the conductivity of polymer in the virgin state is determined by d. The value for d is not greater than 2 n. The conductivity is increased and adjusted by increasing d. Conductivities in the semiconductor region can generally be achieved with d values of about 5 percent of the n value, e.g., d equals 5 when n equals 100.

Preferred electroactive polymers are doped polymers that have conductivities greater than about $1 \times 10^{-10}$ ohm$^{-1}$ cm$^{-1}$, most preferably greater than $1 \times 10^{-4}$ ohm$^{-1}$ cm$^{-1}$. Greater concentrations of the charge-compensating ionic dopant M increase the conductivity to the metallic conductivity regime. The charge-compensating anionic dopant M is selected from the previously recited dopants and the like.

Polymer Fabrication

The starting material for preparing the electroactive polymers of this invention are polymers comprising recurring units of a 3,6-N-substituted carbazole-1,3,4-oxadiazole-2,5-diyl, wherein the substituent on the carbazole nitrogen is lower alkyl of 1–6 carbon atoms or phenyl.

The 3,6-N-substituted carbazole-1,3,4-oxadiazole-2,5-diyl polymers useful for making electroactive polymers by appropriate doping techniques are prepared by several alternate procedures.

One process for the preparation of poly[3,6-N-substituted carbazole-1,3,4-oxadiazole-2,5-diyl] is a two-step procedure described in the literature. See Chemical Abstracts: 88-74564a (N. D. Negodyaev and T. P. Sokolova, deposited document, 1975, VINITI 3390-75). The first step involves polymerization of a mixture of N-substituted carbazole-3,6-dicarboxylic acid chloride and the corresponding dihydrazide to a polyhydrazide, followed by a cyclodehydration step to a polyoxadiazole.

A preferred one-step polymerization procedure is described in commonly assigned U.S. patent application Ser. No. 664,829, filed concurrently herewith, titled "Process for the Preparation of Poly[3,6-N-substituted carbazole-1,3,4-oxadiazole-2,5-diyl]". This process comprises polymerizing N-substituted carbazole-3,6-dicarboxylic acid with 0 to 30% molar excess of hydrazine or a hydrazine salt of a non-oxidizing acid in the presence of polyphosphoric acid. The preferred hydrazine salt is hydrazine hydrochloride. The polymerization reaction is carried out at 120°–180° C. for 2 to 25 hours. The polymer is isolated by coagulation in water, followed by filtration and extraction with methanol, or a like solvent.

Tractable Polymer Fabrication

Subsequent to polymerization, articles such as fibers, ribbons, or free-standing films are cast from solution. The solution is formed by dissolving the desired polymer in a solvent which consists of sulfuric acid, formic acid, methane sulfonic or polyphosphoric acid. The solution temperature is generally from about 20° C. to about 100° C. The polymers are coagulated into solid shapes such as fibers, ribbons, or free-standing films in a basic coagulation bath. For free-standing films, the polymers are fabricated from solutions containing about 2 to 25% polymer dissolved in the solvent. At concentrations which exceed 10%, the cast films take on an anisotropic morphology. The anisotropic property enhances the conductivity in the anisotropic direction. An amine, for example triethylamine, dissolved in a protonic solvent such as $H_2O$ and preferably ethyl alcohol comprises the coagulation bath. The bath is maintained at a lower temperature than the dissolution temperature of the polymer in the solvent. Usually room temperature is selected as the operating temperature of the coagulation bath. The fabricated articles are dried. Elevated temperatures, usually 60° C., and reduced pressure accelerated the drying process. Drying is continued until no further weight loss is observed.

Alternatively, films are cast into water, comprising the coagulation bath, followed by neutralization in aqueous bicarbonate. Neutralized films are washed in water and dried at elevated temperatures, 60°–100° C., under reduced pressure.

Polymer Conductivity Modification

After fabrication of the desired articles from the heterocyclic polymers by means of the procedure described above, the articles are rendered electroactive by, for example, chemical or electrochemical procedures. The articles can be rendered electroactive in an atmosphere which is inert with respect to the polymer and dopant, by contacting them with suitable conductivity modifiers, i.e. dopants. An inert atmosphere is defined as an atmosphere which does not react with the polymer, the dopant, or the electroactive polymer. For example, the atmosphere can be argon, helium, and nitrogen and the like. The doping can also be carried out in an inert liquid medium such as tetrahydrofuran, acetonitrile and the like. The inert liquid medium should be able to wet and swell the polymer but not react with it. The dopants used herein are oxidizing or electron accepting molecules. These dopants may be in the form of gases or vapors, pure liquids or liquid solutions. Preferably, oxygen and water moisture are excluded during and after the doping process because the conductive polymers tend to degrade, i.e. lose conductivity, when exposed thereto.

For example, the polymer can be contacted with conductivity modifiers, such as $AsF_5$, $Br_2$ or $NO^+BF_4^-$, in a tetrahydrofuran solution. The conductivity modifier concentration can be from about 0.001 to about 1 molar and preferably from about 0.01 to about 0.5 molar in the THF or other suitable solvent. Alternative doping methods are taught in U.S. Pat. No. 4,204,216 and incorporated herein by reference.

The incorporation of the dopants into the polymer can be observed by a color change in the polymer as well as an enhanced conductivity. For example, a virgin polymer film having a yellow, orange or brown color, changes to a green, blue or black color with a metallic luster upon doping and the measured conductivity increases by many orders of magnitude.

Alternatively, the polymers can be oxidized to their conductive forms using electrochemical techniques. In this method, herein referred to as electrochemical doping, the polymer is immersed in a suitable electrolyte solution and used as one electrode of an electrochemical cell. Upon passing an electric current through such a cell the polymer becomes oxidized, and charge-compensating anions from the supporting electrolyte become incorporated into the polymer. This doping also proceeds with the characteristic color change described above. Thus, the polymer can be electrochemically doped with whatever appropriately charged ion is present in the electrolyte solution. Electrolyte solutions are comprised of a salt dissolved in a solvent. Suitable solvents are acetonitrile, tetrahydrofuran, 2-methyl-tetrahydrofuran, propylene carbonate, dimethylformamide, dimethylsulfoxide and the like. Alternative electrolytes are specified in U.S. application Ser. No. 334,509, filed Dec. 28, 1981, now abandoned, entitled "Batteries Fabricated With Electroactive Polymers", and completely incorporated herein by reference. Suitable anions are $Cl^-$, $Br^-$, $ClO_4^-$, $BF_4^-$, and $PF_6^-$. The extent of doping can be easily controlled by adjusting the amount of charge electrochemically injected into the polymer, either by controlling the magnitude of the current used (galvanostatic charging) or by controlling the potential of the polymer electrode with respect to a reference electrode (potentiostatic charging).

The above-described electrochemical doping process is completely reversible. The polymer can be "undoped" and returned to its original, neutral, non-conducting state simply by applying a current opposite in sign to that used for the doping process. Upon complete undoping the color of the polymer reverts back to its original color. Thus, for example, an oxidized, conducting poly-[carbazole-oxadiazole] polymer can be re-reduced completely to its neutral, non-conducting form, and the charge-compensating anions incorporated during the electrochemical oxidation process are expelled from the article during electrochemical re-reduction.

Having described the methods of fabrication and the basic heterocyclic systems, the following examples are intended to be illustrative of the invention and not meant to limit the scope thereof. Modification which would be obvious to one of ordinary skill in the art are contemplated to be within the scope of the invention.

EXAMPLES

EXAMPLE 1

Preparation of 3,6-diacetyl-N-ethylcarbazole

Finely powdered anhydrous aluminum chloride (100 g), N-ethylcarbazole (70 g), and 500 ml dry carbon disulfide were placed in a 1-liter, three-necked flask equipped with mechanical stirrer and reflux condenser. Ninety (90) grams of acetyl chloride were added dropwise with stirring. The addition generated enough heat to keep the solvent at reflux. The mixture was heated at reflux during an additional hour and the solvent distilled off. Two hundred (200) ml 1N HCl and 200 ml ice were added cautiously to the flask. The solid product was removed and washed with water. The product was recrystallized twice from ethyl acetate to give 55 g of 3,6-diacetyl-N-ethylcarbazole melting at 184°–190° C.

EXAMPLE 2

Preparation of N-ethylcarbazole-3,6-dicarboxylic acid

Nineteen (19) grams of the 3,6-diacetyl-N-ethylcarbazole from Example 1 was dissolved in 800 ml pyridine and added to 400 ml of 5% aqueous sodium hydroxide in a 6-liter Erlenmeyer flask. While cooling the mixture in ice, 1429 ml of 5% sodium hypochlorite (bleach) was added. The reaction was allowed to stir 3.5 hours at room temperature. A concentrated solution of sodium bisulfite was added until no hypochlorite remained (starch-iodine test). The basic solution was neutralized with concentrated HCl and the precipitated diacid filtered. The yield of N-ethylcarbazole-3,6-dicarboxylic acid was 13.12 g. Elemental analysis was as follows. Calculated for $C_{16}H_{13}NO_4$: %C, 67.84; %H, 4.63; %N, 4.94. Found: %C, 67.60; %H, 4.64; %N, 4.88.

EXAMPLE 3

Preparation of Poly[3,6-N-Ethylcarbazole-1,3,4-oxadiazole-2,5-diyl]

a. Polymer Preparation

The N-ethylcarbazole-3,6-dicarboxylic acid (1.0885 g, 0.0038 mole) from Example 2 and hydrazine hydrochloride (0.2764 g, 0.0040 mole) were stirred together at 140° C. in 18.45 g of polyphosphoric acid. The polymerization was carried out under anhydrous conditions in a dry box. After 22 hours, the dark, rubbery polymer solution was scraped out and stirred with 500 ml cold water. The solid polymer was washed with water and methanol. The crude polymer was extracted overnight with methanol and dried. The polymer product was obtained in about 90% yield. Films were cast from methanesulfonic acid and also from trifluoromethanesulfonic acid.

Elemental analysis of the polymer was as follows. Calculated for $(C_{16}H_{11}N_3O)_n$: %C, 73.55; %H, 4.24; %N, 16.08. Found: %C, 71.44; %H, 4.34, %N, 15.85. The intrinsic viscosity of the polymer measured in methane sulfonic acid at 20° C. was 1.01 dl/g.

b. Electrochemical Doping

A film of poly[3,6-N-ethylcarbazole-1,3,4-oxadiazole-2,5-diyl] was oxidized electrochemically at +0.9 volts vs. a standard calomel electrode (SCE) in an acetonitrile/tetrabutylammonium tetrafluoroborate electrolyte. The doped film had a conductivity of 1–5 siemens per centimeter after drying.

What is claimed is:

1. A tractable electroactive polymer which comprises a charged polymer backbone of recurring units of a 3,6-N-substituted carbazole-1,3,4-oxadiazole-2,5-diyl, wherein the carbazole nitrogen is substituted with lower alkyl of 1 to 6 carbon atoms or phenyl, and a sufficient concentration of a charge-compensating ionic dopant associated therewith, wherein the polymer backbone is capable of undergoing reversible oxidation to form the charged polymer backbone.

2. The electroactive polymer according to claim 1, wherein the recurring unit is 3,6-N-ethyl-carbazole-1,3,4-oxadiazole-2,5-diyl.

3. The electroactive polymer according to claim 1, wherein the charge-compensating ionic dopant as an anion selected from the group consisting of halogen ions, $AsF_4^-$, $AsF_6^-$, $ClO_4^-$, $PF_6^-$, $SO_3CF_3^-$, $BF_4^-$, $NO_3^-$, $POF_4^-$, $CN^-$, $SiF_5^-$, $SbCl_6^-$, $SbF_6^-$, $HSO_4^-$, acetate, benzoate, tosylate, or mixtures of said anions.

4. The electroactive polymer according to claim 1, wherein the polymer backbone has a molecular weight of from about 500 to about 250,000.

5. The electroactive polymer according to claim 4, wherein the polymer backbone has a molecular weight above about 10,000.

6. A tractable electroactive polymer which comprises a charged polymer backbone and charge-compensating ionic dopants associated therewith of the formula:

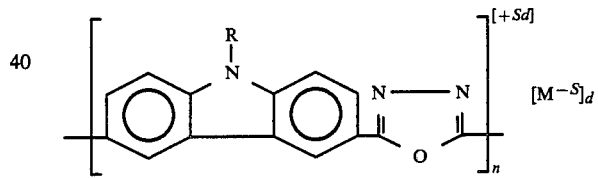

wherein R is lower alkyl of 1 to 6 carbon atoms or phenyl; n is an integer from 2 to 1,000; d is an integer from 1 to 2,000; S is an integer from 1 to 3; and M is a charge-compensating ionic dopant of opposite electrical charge to the charge of the polymer backbone; wherein the polymer backbone is capable of undergoing reversible oxidation to form the charged polymer backbone.

7. The electroactive polymer according to claim 6, wherein R is ethyl.

8. The electroactive polymer according to claim 6, wherein n is from about 5 to about 500.

9. The electroactive polymer according to claim 8, wherein n is from about 10 to about 300.

10. The electroactive polymer according to claim 6, wherein the charge-compensating ionic dopant M is an anion selected from the group consisting of halogen ions, $AsF_4^-$, $AsF_4^-$, $ClO_4^-$, $PF_6^-$, $SO_3CF_3^-$, $BF_4^-$, $NO_3^-$, $POF_4^-$, $CN^-$, $SiF_6^-$, $SbCl_6^-$, $SbF_6^-$, $HSO_4^-$, acetate, benzoate, tosylate, or mixtures of said anions.

* * * * *

UNITED STATES PATENT AND TRADEMARK OFFICE
CERTIFICATE OF CORRECTION

PATENT NO. : 4,597,896
DATED : July 1, 1986
INVENTOR(S) : Peter Denisevich, Jr. et al It is certified that error appears in the above-identified patent and that said Letters Patent are hereby corrected as shown below:

Claim 10, Column 8, Line 62 thereof, the expression "$AsF_4^-$, $AsF_4^-$" should read --$AsF_4$, $AsF_6^-$ --

Claim 10, Column 8, Line 63 thereof, the expression $SiF_6$" should read --$SiF_5$--.

Signed and Sealed this

Twenty-seventh Day of October, 1987

*Attest:*

DONALD J. QUIGG

*Attesting Officer*   Commissioner of Patents and Trademarks